Patented Dec. 22, 1942

2,305,960

UNITED STATES PATENT OFFICE 2,305,960

EDIBLE PRODUCT

James R. Frorer, Wilmington, Del., assignor to Atlas Powder Company, Wilmington, Del., a corporation of Delaware No Drawing. Application June 15, 1940, Serial No. 340,730

2 Claims. (Cl. 99—135)

This invention relates to improved edible products having pulverulent edible material dusted on their exterior surfaces to provide improved appearance and increased palatableness and protection against stickiness.

Heretofore it has been customary to dust many products such as chewing gum, gum drops, cakes, sweet buns and the like with powdered sugar. Such dusted products have a desirable appearance and initial taste. The dusting is also intended to prevent the product from sticking to the fingers when handled or to the wrapper when the product is wrapped.

In humid weather a dust of sugar is frequently rendered ineffective, however, because the sugar tends to absorb moisture and become dissolved. Upon such dissolution the sugar is either absorbed by the product or forms an external coating which provides neither the desired taste and appearance, nor the protection against stickiness.

An object of the present invention is the provision of dusted edible products which retain their appearance, palatableness and resistance to stickiness in humid weather.

Other objects of the invention will hereinafter more fully appear.

In accordance with the present invention, an edible product, particularly a normally sticky or tacky edible, is dusted with pulverulent crystalline mannitol. Mannitol has a pleasant, sweet taste and products dusted therewith have an excellent appearance. The mannitol crystals are substantially non-hygroscopic and maintain their identity and do not tend to become sticky or to coalesce when the edible product is subjected to hot, humid atmospheric conditions.

As exemplary of the invention, chewing gum in sheet form is thoroughly dusted over its entire exterior surface with pulverulent mannitol crystals. When the dusted sheets of gum are cut and wrapped in the conventional wrappers, the sticks of gum retain their freshly dusted appearance and do not stick to the wrapper or to the fingers when removed from the wrapper even after subjection to adverse atmospheric conditions of high heat and humidity.

As another example of the present invention, fresh gum drops are dusted with the pulverulent mannitol crystals. Freshly-made gum drops are relatively sticky. The mannitol dusting is accomplished with little absorption of the mannitol and gives the gum drops an excellent appearance, while at the same time enabling them to be handled or wrapped without sticking.

It will be obvious that the foregoing examples are merely for purposes of illustrating the invention and are not to be taken as limiting. The pulverulent mannitol crystals may be applied to the exterior surface of other edible products as cakes, sweet buns etc. While I have referred to the application of the mannitol as "dusting," it is to be understood that the application may be by dipping the edible product into the pulverulent mannitol, sprinkling the mannitol on the edible product, or otherwise.

By "edible products" I mean to include masticatory products having edible constituents such as chewing gum.

Having fully described the invention, what I claim is as follows:

1. An edible product having a dust of substantially non-hygroscopic pulverulent mannitol crystals on its exterior surface.

2. Chewing gum having a dust of substantially non-hygroscopic, pulverulent mannitol crystals on its exterior surface.

JAMES R. FRORER.